United States Patent
Broder et al.

(12)

(10) Patent No.: US 6,220,558 B1
(45) Date of Patent: Apr. 24, 2001

(54) COMPUTER MONITOR STAND

(75) Inventors: Damon W. Broder; Jefferson Blake West; Christopher Michael Jaggers, all of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/383,807

(22) Filed: Aug. 26, 1999

(51) Int. Cl.[7] .................................................. A47B 91/00
(52) U.S. Cl. .............................. 248/346.02; 108/57.25; 248/917
(58) Field of Search .......................... 248/346.02, 146, 248/160, 163.1, 163.2, 917; 108/57.25

(56) References Cited

U.S. PATENT DOCUMENTS

| | | |
|---|---|---|
| 4,375,265 | 3/1983 | van de Wetering et al. . |
| 5,263,668 | 11/1993 | Reiter ................................ 248/917 X |
| 5,460,865 | 10/1995 | Tsotsis . |
| 5,568,359 | 10/1996 | Cavello et al. .................. 248/917 X |
| 5,588,625 | 12/1996 | Beak ................................. 248/923 X |
| 5,685,441 | 11/1997 | Calfee ............................... 248/917 X |
| 5,733,025 | 3/1998 | Jesse, Sr. .......................... 248/918 X |
| 5,809,905 | * 9/1998 | John et al. ............................ 108/56.1 |
| 5,937,767 | * 8/1999 | Togawa et al. ..................... 108/57.26 |
| 6,053,466 | * 4/2000 | Jordan et al. .................... 248/346.01 |

* cited by examiner

Primary Examiner—Ramon O. Ramirez
(74) Attorney, Agent, or Firm—Haynes and Boone, L.L.P.

(57) ABSTRACT

A monitor stand which allows placement of a computer monitor above or to the side of the base of the docking apparatus. In one embodiment, the monitor stand includes spaced-apart side channel members and adjacent transverse channel members extending between the side members. Each transverse channel member has opposing ends attached to each respective side channel member. A first one of the adjacent transverse channel members is inverted with respect to a second one of the adjacent transverse channel members. A principal advantage of the embodiments presented herein is that the monitor stand can support the sustained loading of even the largest commercially available computer monitors without exhibiting appreciable deflection.

22 Claims, 4 Drawing Sheets

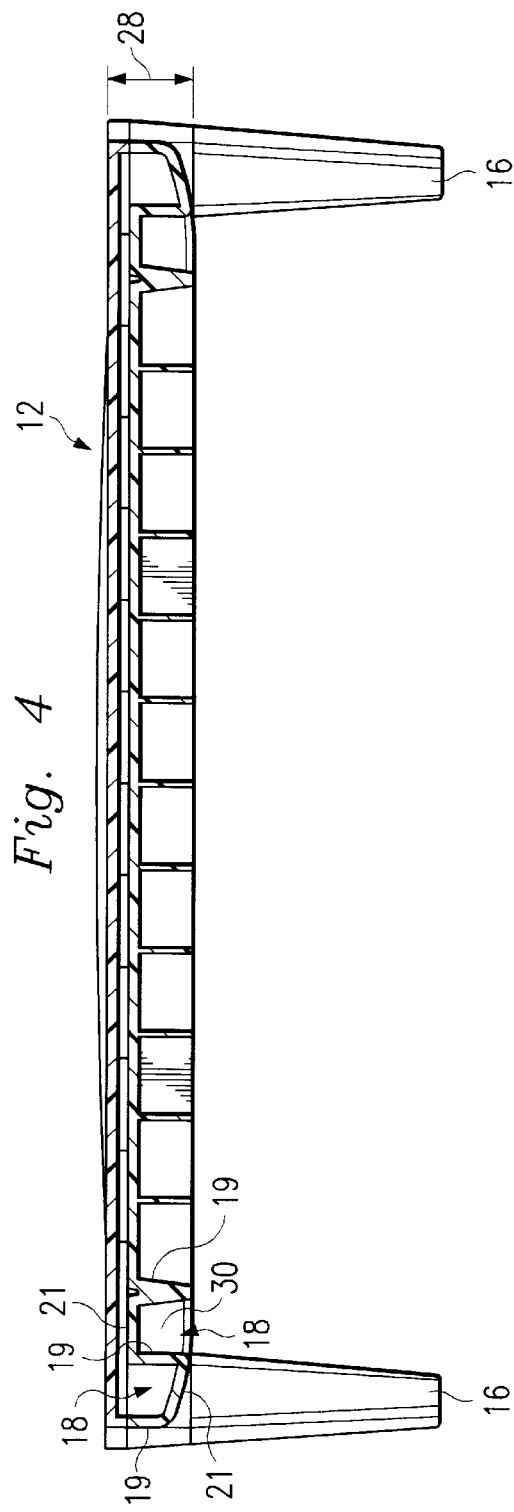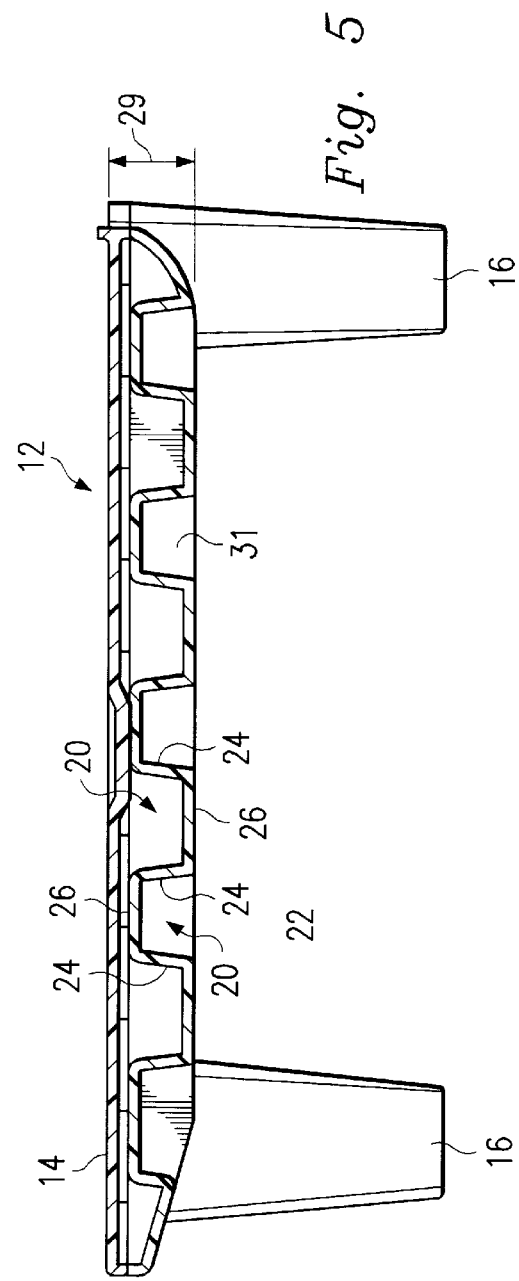

COMPUTER MONITOR STAND

BACKGROUND

The disclosures herein relate generally to computer systems and more particularly to computer monitor stands.

Portable computers such as notebook computers, laptop computers and other similar types of computers, are becoming more and more popular due to their ability to be used in non-office environments. Docking apparatus, such as docking stations, port replicators, etc. are available for some portable computers to enable them to be easily interfaced with certain peripheral equipment such as monitors, printers, modems, etc.

The docking apparatus allows portable computers to be quickly adapted for office use. The docking apparatus is designed to connect the portable computer to the peripheral equipment for use in an office environment. When the need to use the portable computer in a mobile manner arises, it may be detached from the docking device and used in a stand alone fashion.

Docking apparatus typically include a base that the peripheral equipment is connected to, and a monitor stand which allows placement of a monitor above, or to the side of, the base of the docking apparatus. A typical monitor stand includes a generally flat platform portion and legs extending from the platform portion. The base portion engages the portable computer, making connection between the portable computer and the peripheral equipment. Once the portable computer is connected to the base, the peripheral device is operable by the portable computer.

Sheet metal reinforcements are sometimes used to improve the rigidity and sag resistance of plastic monitor stands. However, regulatory testing of docking apparatus for EMI compliance have shown that metal stands and the sheet metal in plastic monitor stands can act as an antenna. The metal acts as an antenna by picking up EMI energy and redirecting it from the stand towards adjacent electronic devices.

U.S. Pat. No. 5,733,025 discloses a selectable height computer monitor stand. The monitor stand includes one or a plurality of rectangular rigid spacers underlying a top. The top is secured to at least one of the spacers by bolts extending through lateral edges of the top and respective end portions of a clamp plate laterally projecting through one of the spacers. The stand height is increased or decreased by inserting or removing additional spacers under the primary monitor stand.

U.S. Pat. No. 5,685,441 discloses a video display unit such as a computer monitor or similar device that is supported at a selected ergonomically correct height by a pedestal unit having one or more vertically stacked pedestal members. Each pedestal member includes a generally horizontal plate portion and a depending wall. A peripheral ledge is interposed between the plate portion and the depending wall. The lower distal edge of the depending wall is spaced from an internal set of support gussets for supporting the pedestal members, vertically stacked in nested relationship, one on the other. Selected ones of the pedestal members have an opening in the side or depending wall portion providing a pocket for storing files, computer disks and other materials at the video display unit site. Opposed parallel inner walls extend from the opening to an opposite side wall to provide a smooth walled pocket for receiving the articles stored therein. The pedestal members are preferably injection molded from plastic and are preferably of a square cross sectional shape, whereby the storage pockets may be arranged in selected positions with respect to each other.

U.S. Pat. No. 5,568,359 discloses a portable computer desktop docking system. The docking system includes a base structure, a port replicator, a shroud and a monitor stand. The monitor stand has a monitor support platform from which four support legs depend. Bottom ends of the legs interlock with side edge projections on the base structure to position the platform above the port replicator and parallel with the desktop.

U.S. Pat. No. 4,852,830 discloses a computer monitor stand having a platform for holding the computer monitor, a swivel piece and a base. The platform is coupled to the swivel piece. The swivel piece is coupled to the base. The base allows the swivel piece to rotate in a certain predetermined rotational angle. The swivel piece allows the platform to vary its angle of inclination. The platform is dynamically adjustable and statically latchable. The platform has a convexly curved bottom and a rack on that bottom. The bottom fits into a curved top of the swivel piece. The concavely curved top includes a cantilevered pawl which engages the rack on the bottom of the platform.

A key factor in the design of a docking device is ensuring that the monitor stand will bear the weight of the monitor over the life of the product. Another key design factor for a monitor stand is its cost. The monitor stand should not add significant cost to the docking apparatus. The typical customer does not perceive there to be an added value in a more costly monitor even if the design of the monitor stand does allow the docking apparatus to pass regulatory testing.

Some monitor stands are constructed solely from plastic. However, conventional plastic monitor stands typically have a maximum rated weight capacity of approximately 45 lbs. This weight limit restricts the use of a monitor larger than about 15". This is a significant limitation as a majority of monitors sold for use with docking apparatus are larger than 15". Monitors in the range of 17" to 21" are becoming commonplace and may weigh 85 lbs or more.

Current plastic monitor stands utilize a simple ribbed shell type design to limit deflection. The ribs are formed on only one side of the platform. However, attempts to use this current type of rib construction for producing a cost-effective monitor stand that will withstand the sustained weight of heavy monitors have been unsuccessful. To attain the required rigidity necessary for heavy monitors using current rib constructions, the cost of the monitor stand is adversely affected due to the need to use expensive polymers to increase the size of the monitor stand and due to limitations in the ability to reliably mold the stands. Furthermore, the thickness of the platform portion of the monitor stand increases dramatically. As a result of the increased thickness, it is difficult to attain a low-profile, ergonomically-correct monitor stand using a conventional ribbed construction for applications where the base of a docking apparatus resides beneath the monitor stand.

Accordingly, there is a need for a monitor stand that is non-obtrusive, that can be economically manufactured, and that is capable of supporting the sustained weight of even the heaviest commercially available monitors.

SUMMARY

One embodiment, accordingly, provides a plastic monitor stand that uses an inverted rib construction to provide increased rigidity. To this end, one embodiment provides a base, spaced-apart side channel members formed in the base and adjacent transverse channel members formed in the base and extending between the side channel members. Each transverse channel member has opposing ends attached to a respective side channel member. A first one of the adjacent transverse channel members is inverted with respect to a second one of the adjacent transverse channel members. A principal advantage of the embodiments presented herein is that the monitor stand can support the sustained loading of even the largest commercially available monitors without exhibiting adverse deflection.

BRIEF DESCRIPTION OF THE DRAWING FIGURES

FIG. 4 is a cross sectional view taken along line 4—4 in FIG. 1.

FIG. 5 is a cross sectional view taken along line 5—5 in FIG. 1.

DETAILED DESCRIPTION

Figure 1:
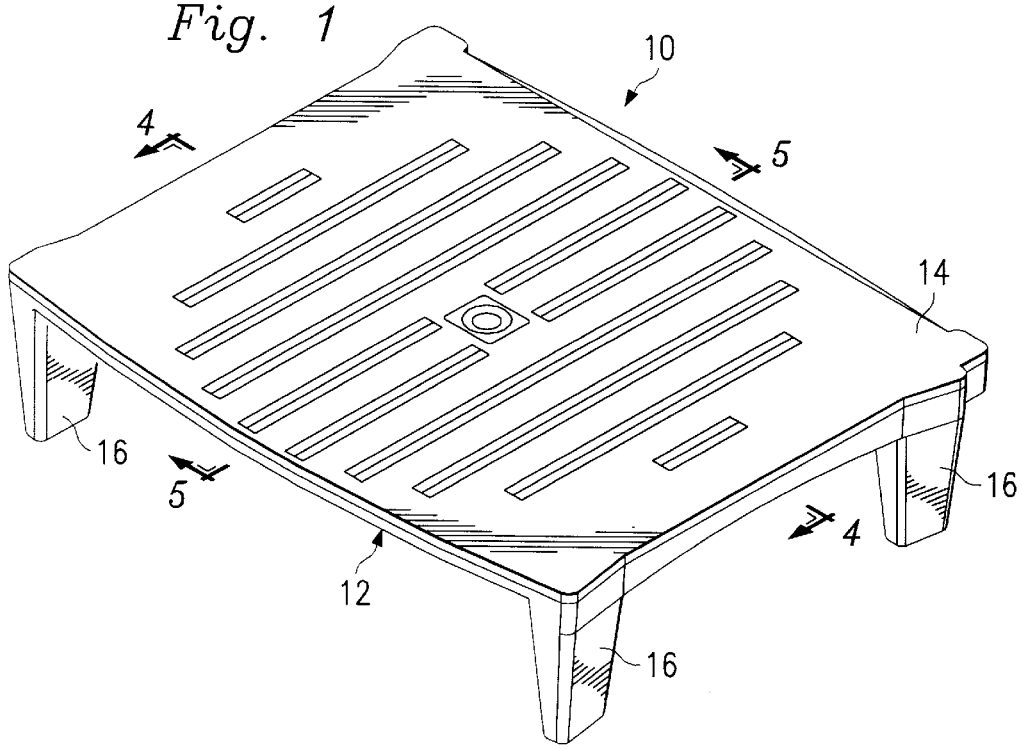
FIG. 1 is a perspective view illustrating an embodiment of a monitor stand having an attached cover.
Figure 2:
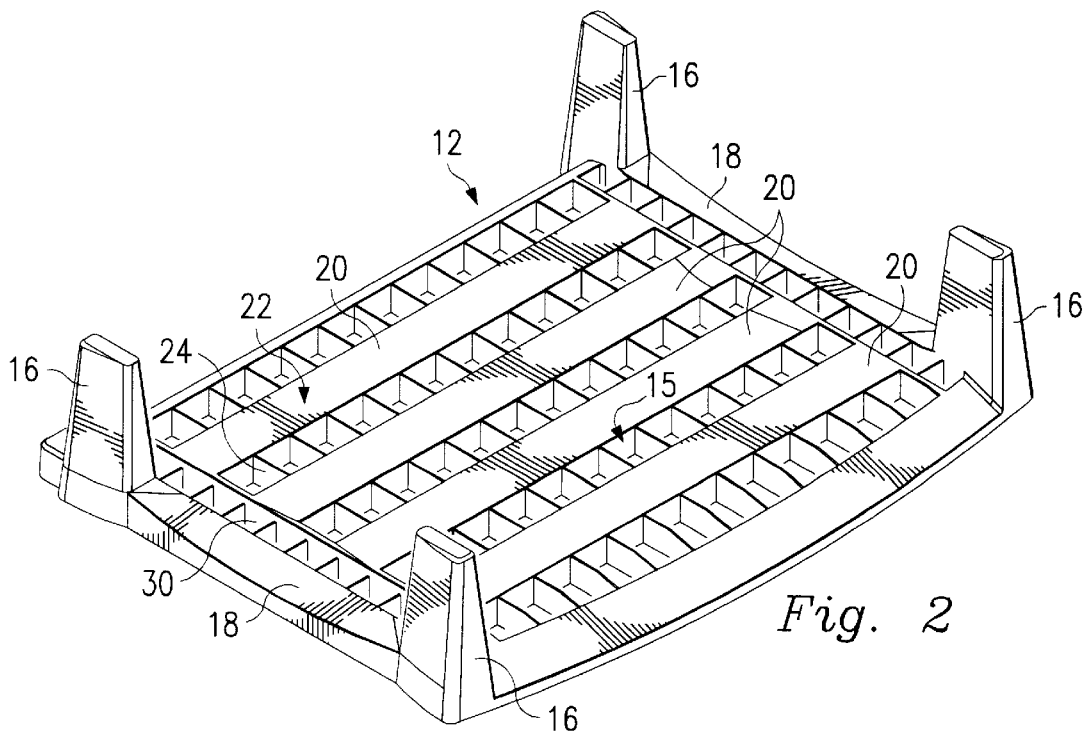
FIG. 2 is a perspective view illustrating an embodiment of the bottom side features of a monitor stand.
Figure 3:
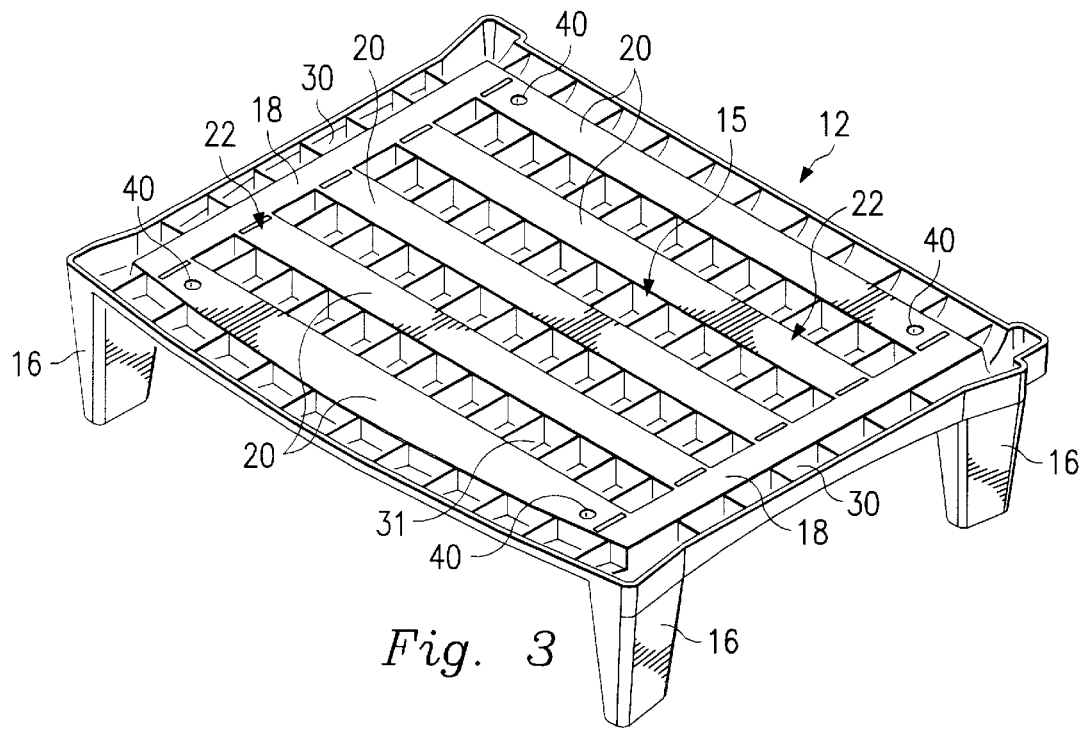
FIG. 3 is a perspective view illustrating an embodiment of the top side features of a monitor stand.

An embodiment of a monitor stand 10 is illustrated in FIGS. 1 to 3. The monitor stand 10 includes a base 12 and a cover 14 attached to the base 12. The base 12 includes a platform 15, FIGS. 2 and 3, that has a generally rectangular shape. A plurality of legs 16 are attached to the platform 15. The cover 14 and the base 12 are injection molded from a polymeric material such as polycarbonate with 10% glass fiber. A preferred material is a product sold under the trademark Lexan by General Electric under the part number 500R.

The platform 15, FIG. 3, includes spaced apart side channel members 18 and a plurality of adjacent transverse channel members 20 extending between the side channel members 18. The side channel members 18 extend in a direction generally perpendicular to the transverse channel members 20. Each transverse channel member has opposing ends 22 that are attached to the respective side channel member 18. In a preferred embodiment, the side channel members 18 and the transverse channel members 20 are integrally formed.

As best shown in FIGS. 2 and 3, each leg 16 may be integrally formed with the adjacent side channel members 18 and the adjacent transverse channel members 20. Forming the legs 16 in this manner accomplishes two important objectives. First, the legs 16 are moved out to the sides of the platform 15 while still being positioned under it. This orientation allows the weight of a monitor to be applied on top of the legs 16 rather than in an off-axis direction. Second, the rigidity of each leg 16 relative to the platform 15 is significantly increased. This contributes the ability to support relatively heavy monitors without adverse deflection of the legs 16.

Each side channel member 18, FIG. 4, includes two opposing walls 19 with a base wall 21 attached between the two opposing walls 19. Each side channel member 18 is inverted with respect to each respective adjacent side channel member 18. In this orientation, the base wall 21 of one side channel member 18 is offset by a prescribed side channel member offset distance 28 with respect to each adjacent respective side channel member 18. A plurality of ribs 30 are attached to the opposing walls 19 and to the base wall 21 of each side channel member 18.

Each transverse channel member 20, FIG. 5, includes two opposing walls 24 with a base wall 26 attached between the two opposing walls 24. Each transverse channel member 20 is inverted with respect to each respective adjacent transverse channel member 20. In this orientation, the base wall 26 of one transverse channel member 20 is offset by a prescribed transverse member offset distance 29 with respect to the base wall 26 of each adjacent respective transverse channel member 20. As illustrated in the embodiment of FIGS. 4 and 5, the side channel member offset distance 28 and the transverse channel member offset distance 29 are approximately the same. However, in another embodiment, the side channel member offset distance 28 and the transverse channel member offset distance 29 may be substantially different. A plurality of ribs 31 are attached to the opposing walls 24 and to the base wall 26 of each transverse channel member 20.

Figure 6:
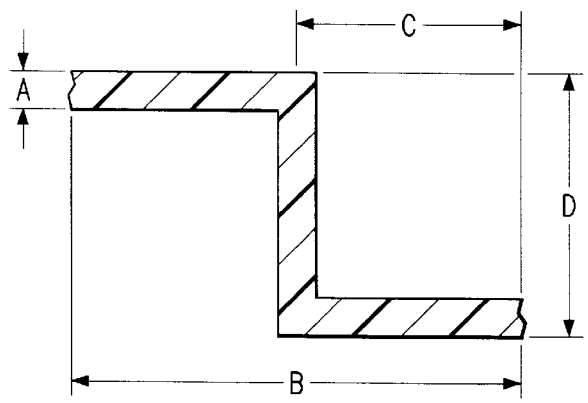
FIG. 6 is a cross sectional view illustrating an embodiment of a portion of a channel according to the present disclosure.
Figure 7:
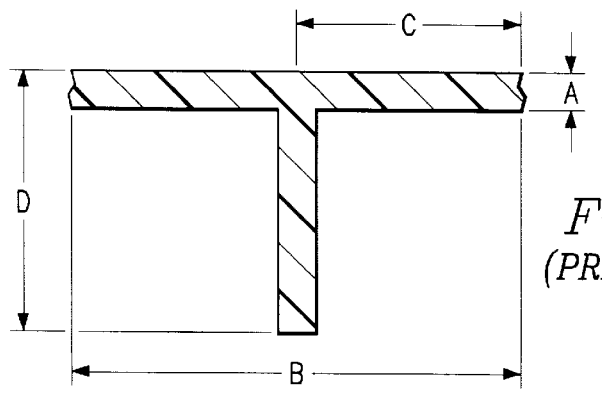
FIG. 7 is a cross sectional view illustrating an embodiment of a portion of a channel according to the prior art.

A key aspect of the invention is increasing the flexural strength of the base 12, FIG. 2. The inverted construction of the side and transverse channel members and their respective offset base walls members significantly increases the moment of inertia of the base 12. For example, the cross section illustrated in FIG. 6 represents a portion of a channel according to the present disclosure, and the cross section illustrated in FIG. 7 represents a portion of a channel according to prior constructions using a single-sided ribbed construction. For the same wall thickness A, unit width B, split width C and height D, the channel construction of the present disclosure, FIG. 6, exhibits a moment of inertia approximately 350% greater than that of a single-sided rib construction, FIG. 7.

Figure 8:
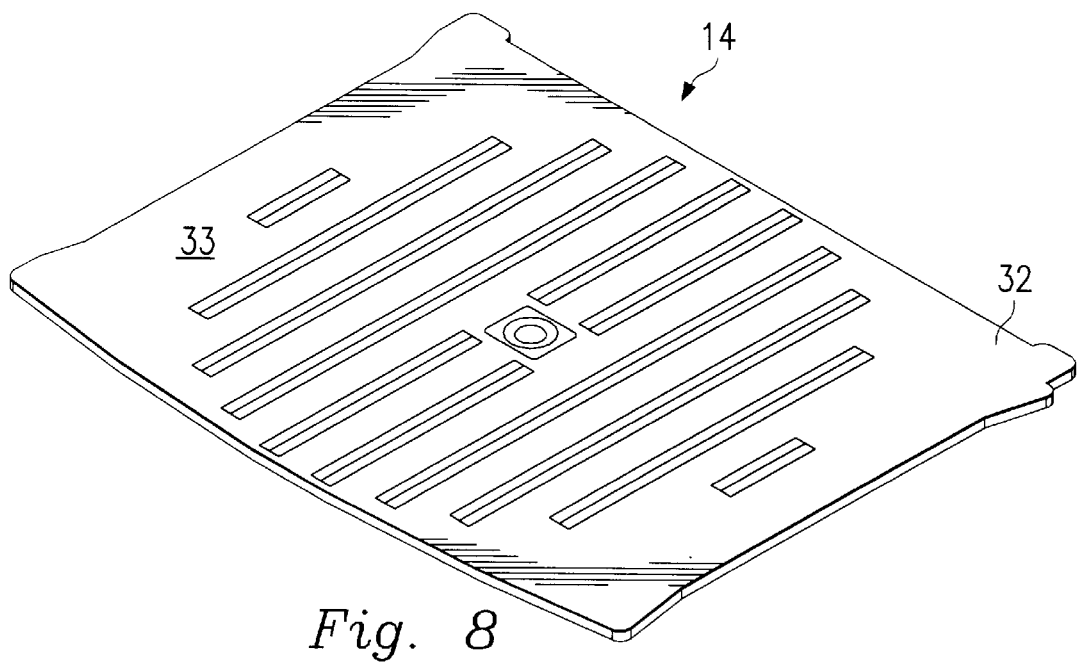
FIG. 8 is a perspective view illustrating an embodiment of the top side features of a monitor stand cover.
Figure 9:
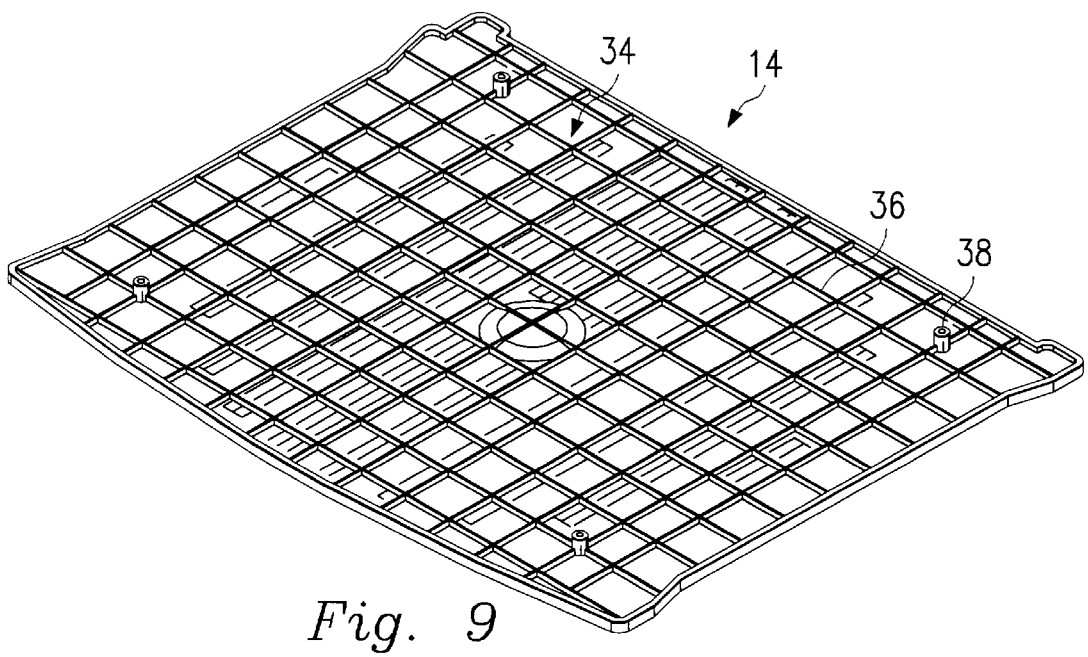
FIG. 9 is a perspective view illustrating an embodiment of the bottom side features of a monitor stand cover.

The cover 14 includes a first side 32, FIG. 8, and a second side 34, FIG. 9. The first side 32 has a generally flat surface 33 upon which a monitor is supported. The second side 34 includes a plurality of ribs 36 and mounting bosses 38. The ribs 36 minimize warping of the cover 14 during the molding process by providing a nominal degree of additional flexural strength. The mounting bosses 38 are positioned such that they align with a respective hole 40, FIG. 3, in the base 12, allowing the cover 14 to be fastened to the base 12 using fasteners such as self-tapping screws.

One embodiment provides a base having spaced-apart side channel members formed in the base and adjacent transverse channel members formed in the base and extending between the side channel members. Each transverse channel member has opposing ends attached to a respective side channel member. A first one of the adjacent transverse channel members is inverted with respect to a second one of the adjacent transverse channel members.

Another embodiment provides a computer monitor stand including a base having two spaced-apart side channel members formed in the base and a plurality of adjacent transverse channel members formed in the base and extending between the side channel members. Each transverse channel member includes opposing ends, two opposing walls and a base wall attached between the opposing walls. The base wall of one transverse channel member is offset with respect to the base wall of an adjacent transverse channel member. The ends of each transverse channel member are attached to a respective side channel member.

A further embodiment provides a method of increasing the flexural strength of a monitor stand. The method includes forming a base having two spaced apart side channel members and forming a plurality of elongated adjacent transverse channel members extending between the side channel members. Each channel member is inverted with respect to an adjacent transverse channel members. A first end of each transverse channel member is attached to a first one of the side channel members and a second end of each transverse channel member is attached to a second one of the side channel members.

As it can be seen, the embodiments presented herein provide several advantages. The monitor stand can support the sustained loading of even the largest commercially available computer monitors without exhibiting adverse deflection. The stand can be made from relatively inexpensive polymeric resins. The stand exhibits a negligible amount of sag over time under the weight of the monitor. The thickness of the platform portion of the monitor stand can be minimized. No metal reinforcements are needed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A monitor stand, comprising:
   a base;
   spaced-apart side channel members formed in the base;
   adjacent transverse channel members formed in the base and extending between the side channel members;
   each transverse channel member having opposing ends attached to each respective side channel member;
   a first one of the adjacent transverse channel members being inverted with respect to a second one of the adjacent transverse channel members; and
   wherein each transverse channel member includes spaced apart opposing walls and a base wall connected between the opposing walls.

2. The monitor stand of claim 1 further comprising a plurality of ribs, each rib attached to the base wall and at least one of the adjacent opposing walls.

3. The monitor stand of claim 1 further comprising a cover attached to the base.

4. The monitor stand of claim 1 wherein the base wall of the first transverse channel member is offset from the base wall of the second transverse channel member.

5. The monitor stand of claim 4 wherein one of the opposing walls of the first transverse channel member and one of the opposing walls of the second transverse channel member is a common wall.

6. The monitor stand of claim 2 further comprising a plurality of legs attached adjacent to each side channel member.

7. The monitor stand of claim 6 wherein the legs are integrally formed with at least a portion of the side channel members.

8. The monitor stand of claim 6 wherein the legs are integrally formed with at least a portion of the adjacent side channel members and the transverse channel members.

9. A monitor stand, comprising:
   a base;
   spaced-apart side channel members formed in the base;
   adjacent transverse channel members formed in the base and extending between the side channel members;
   each transverse channel member having opposing ends attached to each respective side channel member;
   a first one of the adjacent transverse channel members being inverted with respect to a second one of the adjacent transverse channel members; and
   wherein each transverse channel member and each side channel member include spaced apart opposing walls and a base wall connected between the opposing walls.

10. A monitor stand for supporting a computer monitor comprising:
    a base;
    two spaced-apart side channel members formed in the base; and
    a plurality of adjacent transverse channel members formed in the base and extending between the side channel members, each transverse channel member including opposing ends, two opposing walls and a base wall attached between the opposing walls, the base wall of one transverse channel member being offset with respect to the base wall of an adjacent transverse channel member, the ends of each transverse channel member being attached to a respective side channel member.

11. The monitor stand of claims 10 further comprising a cover attached to the base, the cover including a plurality of ribs.

12. The monitor stand of claim 10 wherein adjacent transverse channel members have a common wall.

13. The monitor stand of claim 10 further comprising a plurality of legs attached adjacent to each side channel member.

14. The monitor stand of claim 13 wherein the legs are integrally formed with a portion of the side channel members.

15. The monitor stand of claim 10 further comprising a plurality of ribs, each rib attached to the base wall and at least one of the opposing walls.

16. A method of increasing the flexural strength of a monitor stand, comprising:
    forming a base having spaced apart side channels members;
    forming a plurality of elongated adjacent transverse channel members extending between the side channel members, each transverse channel member being inverted with respect to an adjacent transverse channel member;
    attaching a first end of each transverse channel member to a first one of the side channel members and a second end of each transverse channel member to a second one of the side channel members; and
    wherein forming the side channel members and the transverse channel members includes forming a plurality of opposing side walls and a plurality of base walls.

17. A method of increasing the flexural strength of a monitor stand, comprising:
    forming a base having spaced apart side channel members;
    forming a plurality of elongated adjacent transverse channel members extending between the side channel members, each transverse channel member being inverted with respect to an adjacent transverse channel member;

attaching a first end of each transverse channel member to a first one of the side channel members and a second end of each transverse channel member to a second one of the side channel members; and wherein forming the plurality of opposing side walls and base walls includes offsetting each base wall with respect to each adjacent base wall.

18. A method of increasing the flexural strength of a monitor stand, comprising:

forming a base having spaced apart side channel members;

forming a plurality of elongated adjacent transverse channel members extending between the side channel members, each transverse channel member being inverted with respect to an adjacent transverse channel member;

each transverse channel member includes spaced apart opposing walls and a base wall connected between the opposing walls; and attaching a first end of each transverse channel member to a first one of the side channel members and a second end of each transverse channel member to a second one of the side channel members.

19. The method of claim 18 further comprising attaching a cover adjacent to the base.

20. The method of claim 18 further comprising attaching a plurality of legs to the side channel members.

21. The method of claim 18 wherein attaching the plurality of legs includes integrally forming the legs with at least a portion of the side channel members.

22. The method of claim 21 further comprising integrally forming at least one rib with each side channel member and with each transverse channel member.

* * * * *